United States Patent
Li

Patent No.: US 11,984,728 B1
Date of Patent: May 14, 2024

(54) INTELLIGENT OPTIMIZED POWER MONITORING SHUTOFF DEVICE, AND SYSTEM MONITORING SHUTOFF METHOD

(71) Applicant: Jinli Health Technology Co., Ltd., Kaohsiung (TW)

(72) Inventor: Qiao-Mi Li, Kaohsiung (TW)

(73) Assignee: JINLI HEALTH TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 18/187,271

(22) Filed: Mar. 21, 2023

(30) Foreign Application Priority Data

Jan. 19, 2023 (TW) ................................. 112102499

(51) Int. Cl.
*H02J 3/38* (2006.01)
*H02J 3/46* (2006.01)

(52) U.S. Cl.
CPC .............. *H02J 3/381* (2013.01); *H02J 3/388* (2020.01); *H02J 3/46* (2013.01)

(58) Field of Classification Search
CPC ............... H02J 3/381; H02J 3/388; H02J 3/46
See application file for complete search history.

(56) References Cited

U.S. PATENT DOCUMENTS

| 2013/0154394 | A1* | 6/2013 | Mildenstein | ............... | G05F 1/46 307/131 |
| 2015/0381108 | A1* | 12/2015 | Höft | ........................ | H02S 50/00 361/91.1 |
| 2016/0359453 | A1 | 12/2016 | Jones | | |
| 2018/0351015 | A1* | 12/2018 | Hopf | ...................... | H02H 3/023 |

FOREIGN PATENT DOCUMENTS

| CN | 104578413 A | 4/2015 |
| CN | 111245100 A | 6/2020 |
| CN | 110187692 B | 2/2021 |
| CN | 215817653 U | 2/2022 |
| TW | M636645 U | 1/2023 |

* cited by examiner

*Primary Examiner* — Charles Cai
(74) *Attorney, Agent, or Firm* — Muncy, Geissler, Olds & Lowe, P.C.

(57) ABSTRACT

An intelligent optimized power monitoring shutoff device includes a power conversion module, first current detection module, second current detection module, switch module, measure control module, and bypass module coupled with each other. The power conversion module enables one of the power generation devices to supply power to each module. The first and second current detection modules detect the power generation current value of the power generation device and the overall current value of the power generation system. The measure control module compares the two current values, and switches the switch module to the open-circuit status when the power generation current value is smaller than the overall current value, such that current of the power generation system flows through the bypass module. An intelligent optimized power monitoring shutoff system is provided for monitoring the operation status and maintaining the maximum power generation efficiency.

4 Claims, 6 Drawing Sheets

INTELLIGENT OPTIMIZED POWER MONITORING SHUTOFF DEVICE, AND SYSTEM MONITORING SHUTOFF METHOD

BACKGROUND OF THE INVENTION

1. Field of the Invention

The present invention relates to monitoring shutoff device, system, and method thereof, and more particularly, to an intelligent optimized power monitoring shutoff device, system, and method thereof.

2. Description of the Related Art

With the increasing development of science and technology, the current society is now full of electrical equipment, such that the demand for electricity gradually increases as well. Therefore, many countries are also actively increasing various power generation systems in recent years, so as to meet the increasing demand for electricity.

Therein, the power generation system is formed of many power generation devices (such as batteries in electric vehicles, generators in power plants, and solar panels, etc.) that are connected in series or in parallel, and the ON and OFF status of the power generation devices is usually performed manually. Therefore, a person has to be present all the time to monitor the operation status of the power generation device, such that a general power generation system requires a large amount of manpower for on-site monitoring. Further, when a failure or abnormality in a single power generation device occurs, and the staff person fails to be aware of that and accordingly shut down the power generation device immediately, the rest of the power generation devices will be overloaded to compensate for the lost power generation capacity, resulting in shortened service life of the rest of the power generation devices. Also, the overall safety of the power generation system will be decreasing as well, resulting in a significant increase in the probability of power generation system accidents.

Besides, in the electrical circuit system of residence, the overall system is usually controlled through a distributor. However, there are usually many electrical appliances connected to each circuit of the circuit system, and the distributor is unable to perform a local single-point control. Therefore, when one of the electrical appliances in the circuit fails or a faulty wiring occurs, the distributor is unable to immediately isolate the electrical appliance or cut off the power supply of the circuit, causing a low safety issue of the current residential circuit system.

SUMMARY OF THE INVENTION

To improve the issues above, the present invention discloses an intelligent optimized power monitoring shutoff device and system thereof, so as to carry out a real-time monitoring on the power generation status of the power generation device. Also, when an abnormality of the power generation device occurs, the present invention is able to isolate the abnormal power generation device immediately, thereby preventing the occurrence of disasters and maintaining the maximum power generation efficiency of the entire power generation system.

For achieving the aforementioned objectives, the present invention provides an intelligent optimized power monitoring shutoff device, which is applied to a power generation system. The power generation system comprises a plurality of power generation strings. Each power generation string comprises a plurality of power generation devices. The intelligent optimized power monitoring shutoff device is coupled with at least one of the power generation devices. The intelligent optimized power monitoring shutoff device comprises a power conversion module, a first current detection module, a second current detection module, a switch module, a measure control module, and a bypass module. The power conversion module is coupled with one of the power generation devices and converts the inputted power into the power needed for each module. The first current detection module is coupled with this power generation device and the power conversion module, and detects a power generation current value of this power generation device. The second power detection module is coupled with other power generation devices and the power conversion module, and detects an overall current value of the connected power generation strings. The switch module is coupled with the first current detection module, and the switch module is normally in a closed-circuit status. The measure control module is coupled with the power conversion module, the first current detection module, the second current detection module, and the switch module. The measure control module comprises a current compare control unit, which compares the power generation current value and the overall current value. When the power generation current value is smaller than the overall current value, the current compare control unit outputs a current abnormal signal to the switch module, and controls the switch module to be switched from the closed-circuit status to the open-circuit status. The bypass module is coupled with the switch module. When the switch module enters the open-circuit status, the current of the connected power generation strings flows through the bypass module.

In an embodiment, the present invention provides a monitoring shutoff method of an intelligent optimized power monitoring shutoff device, comprising following steps. In step A1, a first current detection module of the intelligent optimized power monitoring shutoff device detects a power generation current value of one of the power generation devices, and a second current detection module of the intelligent optimized power monitoring shutoff device detects an overall current value of one of the power generation strings. In step A2, a measure control module of the intelligent optimized power monitoring shutoff device compares if the power generation current value is smaller than the overall current value. If so, a step A3 is carried out. In step A3, the measure control module outputs a current abnormal signal to a switch module of the intelligent optimized power monitoring shutoff device, and controls the switch module to be switched from the closed-circuit status to the open-circuit status. If no, a step A4 is carried out. In step A4, the switch module maintains the closed-circuit status.

In an embodiment, the present invention further provides an intelligent optimized power monitoring shutoff system, comprising a plurality of intelligent optimized power monitoring shutoff devices and a communication control device. The communication control device is coupled with the intelligent optimized power monitoring shutoff devices, and comprises a calculation module and a compare control module. The calculation module receives the power generation current value, overall current value, and power generation voltage value transmitted by a communication unit of each intelligent optimized power monitoring shutoff device. The calculation module calculates a current standard value according to the power generation current value and the overall current value and calculates a voltage standard value according to the power generation voltage value. The compare control module respectively compares the power generation current value with the current standard value, and compares the power generation voltage value with the voltage standard value. If the power generation current value of one of the power generation devices is smaller than the current standard value, or the power generation voltage value is smaller than the voltage standard value, the compare control module outputs a shutoff signal to the switch module corresponding to one of the power generation devices, and controls the switch module to be switched to the open-circuit status.

In an embodiment, the present invention further provides a monitoring shutoff method of an intelligent optimized power monitoring shutoff system, comprising following steps. In step B1, the first current detection module of each intelligent optimized power monitoring shutoff device detects the power generation current value of each power generation device, the second current detection module of each intelligent optimized power monitoring shutoff device detects the overall current value of each power generation string, the measure control module of each intelligent optimized power monitoring shutoff device detects the power generation voltage value of each power generation device, and a micro control module of each intelligent optimized power monitoring shutoff device transmits the power generation current value, overall current value, and the power generation voltage value to the communication control device. In step B2, a calculation module of the communication control device calculates a current standard value according to the power generation current value and the overall current value and calculates a voltage standard value according to the power generation voltage value. In step B3, a compare control module of the communication control device compares the power generation current value with the current standard value, and compares the power generation voltage value with the voltage standard value. If the power generation current value of one of the power generation devices is smaller than the current standard value, or the power generation voltage value is smaller than the voltage standard value, the method proceeds to a step B4. In step B4, the compare control module outputs a shutoff signal to the switch module of one of the intelligent optimized power monitoring shutoff devices which is coupled with one of the corresponding power generation devices, and controls the switch module to be switched from the closed-circuit status to the open-circuit status. If the power generation current value of one of the power generation devices is not smaller than the current standard value and the power generation voltage value is not smaller than the voltage standard value, a step B5 is carried out. In step B5, the switch module maintains the closed-circuit status.

With such configuration, the intelligent optimized power monitoring shutoff device of the present invention keeps monitoring the power generation status of the power generation device, such that when the power generation device undergoes an abnormality, the present invention is able to immediately isolate the abnormal power generation device, thereby preventing disasters and maintaining the maximum power generation efficiency of the overall power generation system.

Also, in the intelligent optimized power monitoring shutoff system disclosed by the present invention, the communication control device is able to receive the information outputted by each intelligent optimized power monitoring shutoff device, and at the same time provided with the capability of controlling the switch module. Therefore, the communication control device is able to comprehensively and precisely monitor the operation status of each power generation device in the power generation system, so as to achieve the purpose of maintaining the maximum power generation efficiency of the overall power generation system.

DETAILED DESCRIPTION OF THE INVENTION

Figure 1:
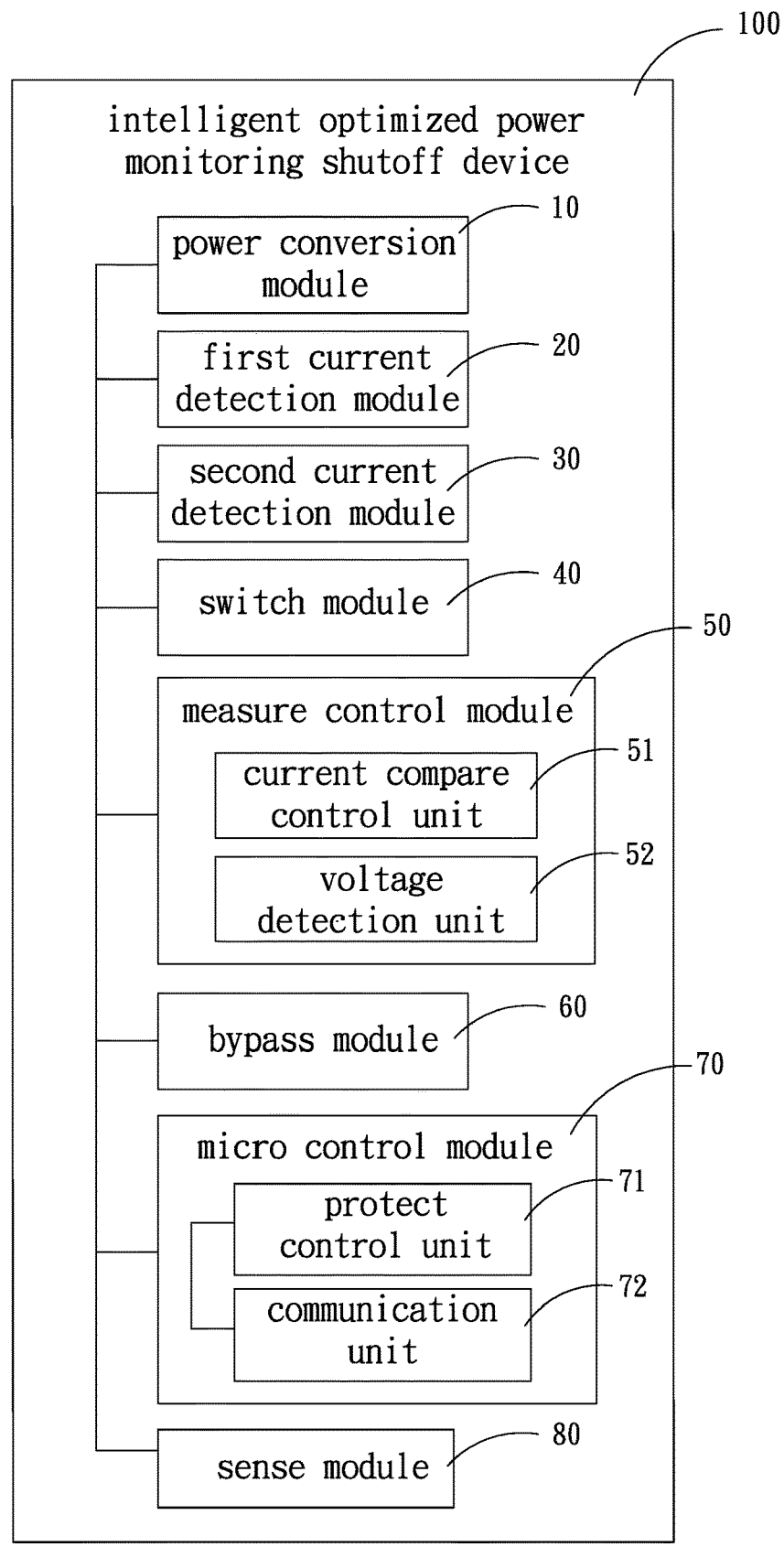
FIG. 1 is a block view of the intelligent optimized power monitoring shutoff device in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, an intelligent optimized power monitoring shutoff device 100 in accordance with an embodiment of the present invention is disclosed, which is applied to a power generation system. The power generation system comprises a plurality of power generation strings 1. Each power generation string 1 comprises a plurality of power generation devices 200. The intelligent optimized power monitoring shutoff device 100 is coupled with one of the power generation devices 200 of one of the power generation strings 1 and a communication control device 300. The intelligent optimized power monitoring shutoff device 100 comprises a power conversion module 10, a first current detection module 20, a second current detection module 30, a switch module 40, a measure control module 50, and a bypass module 60. In the embodiment, the power generation system is allowed to be a solar power generation system, ordinary power plant, or vehicle power generation system, and the power generation device 200 is allowed to be a solar panel or generator, etc.

Figure 4:
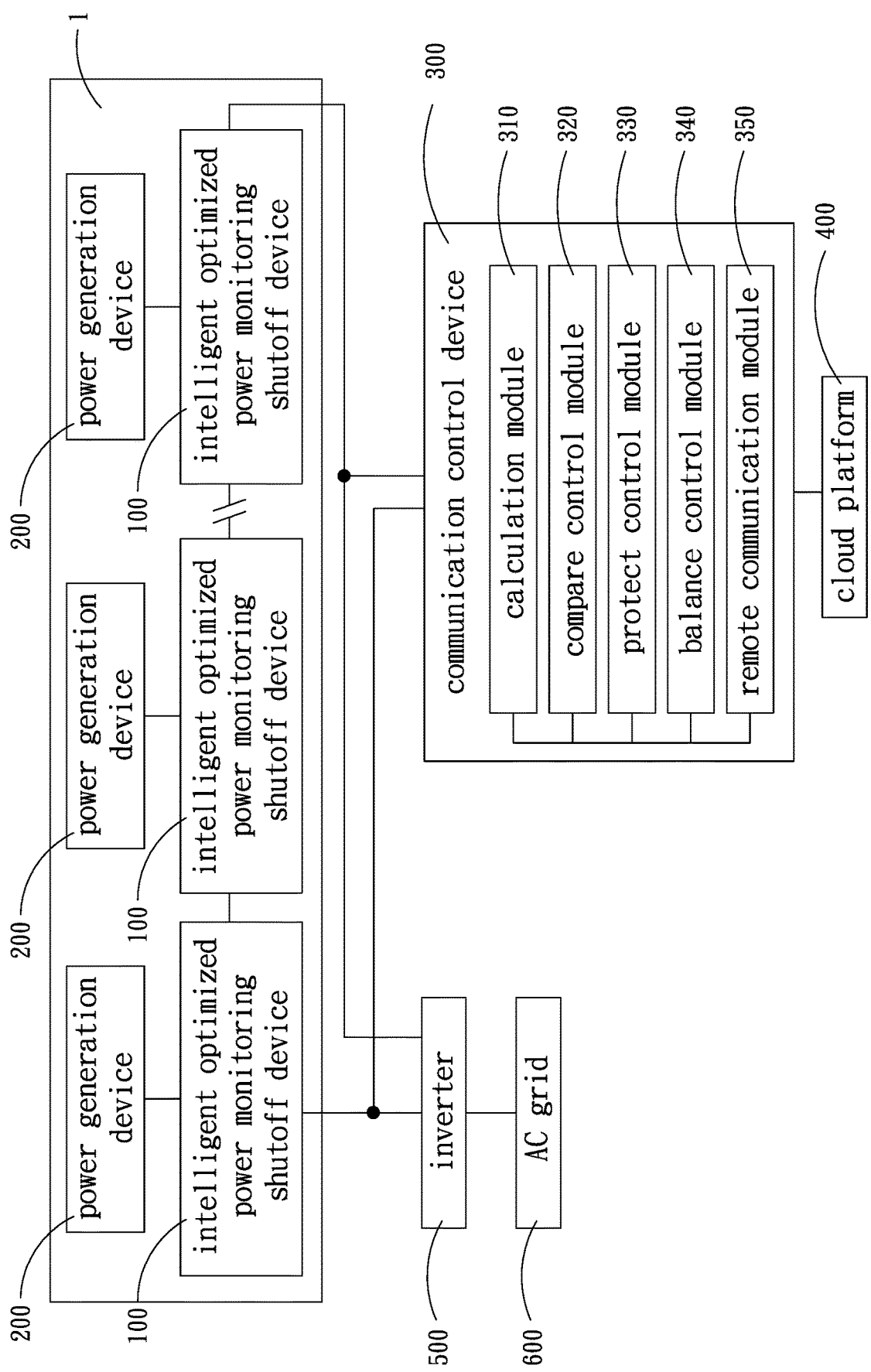
FIG. 4 is a block view of the intelligent optimized power monitoring shutoff system in accordance with an embodiment of the present invention.
Figure 5:
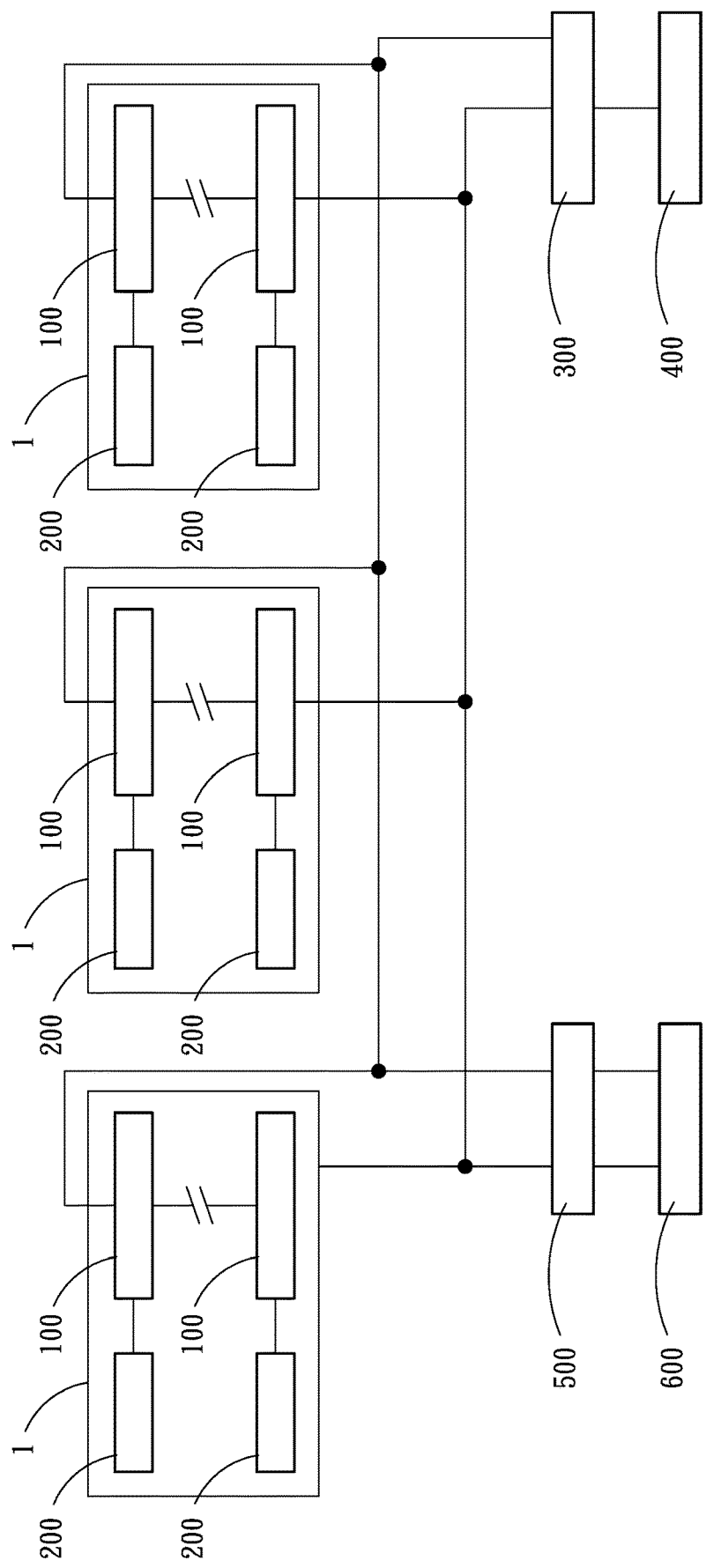
FIG. 5 is a block view of the intelligent optimized power monitoring shutoff system, illustrating the connection of each device.

Therein, in the embodiment, a plurality of intelligent optimized power monitoring shutoff devices 100 are provided. Each intelligent optimized power monitoring shutoff device 100 is connected with each power generation device 200, and then the intelligent optimized power monitoring shutoff devices 100 are connected with each other in series to form a power generation string 1 (as shown by FIG. 4 and FIG. 5). Also, in other embodiments, the power generation device 200 is allowed to be an electrical appliance in residence as well, so that when the electrical appliance fails to operate normally, the intelligent optimized power monitoring shutoff device 100 is able to isolate the specific electrical appliance, thereby immediately preventing the occurrence of disasters.

The power conversion module 10 is coupled with one of the power generation devices 200 of one of the power generation strings 1. The power conversion module 10 converts a power inputted by one of the power generation devices 200 into a power needed by each module, allowing each module to operate with the power of the power generation device 200. Therein, in the embodiment, the power conversion module 10 is a DC-to-DC converter.

The first current detection module 20 is coupled with one of the power generation devices 200, the power conversion module 10, and the measure control module 50. The first current detection module 20 detects a power generation current value of one of the power generation devices 200, and outputs the power generation current value to the measure control module 50 for the measure control module 50 to carry out subsequent comparisons.

The second current detection module 30 is coupled with other power generation devices 200, the power conversion module 10, and the measure control module 50. The second current detection module 30 detects an overall current value of one of the power generation strings 1, and outputs the overall current value to the measure control module 50 for the measure control module 50 to carry out subsequent comparisons. Therein, the overall current value is an overall string current of one of the power generation strings 1.

The switch module 40 is coupled with the first current detection module 20 and the bypass module 60. The switch module 40 is normally in a closed-circuit status. Therein, in the embodiment, if the power generation device 200 connected with the intelligent optimized power monitoring shutoff device 100 is in the normal power generation status, the switch module 40 is normally in the said closed-circuit status, such that the power generation device 200 is able to provide proper power supply. If the power generation device 200 connected with the intelligent optimized power monitoring shutoff device 100 malfunctions or stops operating and fails to normally carry out the power generation process, the switch module 40 is switched to an open-circuit status, so as to disconnect the connection between the power generation device 200 connected with the intelligent optimized power monitoring shutoff device 100 and other power generation devices 200, thereby preventing other power generation devices 200 from being affected, and ensuring the overall operation of the power generation system.

The measure control module 50 is coupled with the power conversion module 10, the first current detection module 20, the second current detection module 30, and the switch module 40. The measure control module 50 comprises a current compare control unit 51. The current compare control unit 51 compares the power generation current value and the overall current value. If the power generation current value is smaller than the overall current value, the current compare control unit 51 outputs a current abnormal signal to the switch module 40, and controls the switch module 40 to be switched from the closed-circuit status to the open-circuit status. If the power generation current value is not smaller than the overall current value, the current compare control unit 51 stops outputting the current abnormal signal to the switch module 40, and the switch module 40 is then recovered to the closed-circuit status.

Figure 2:
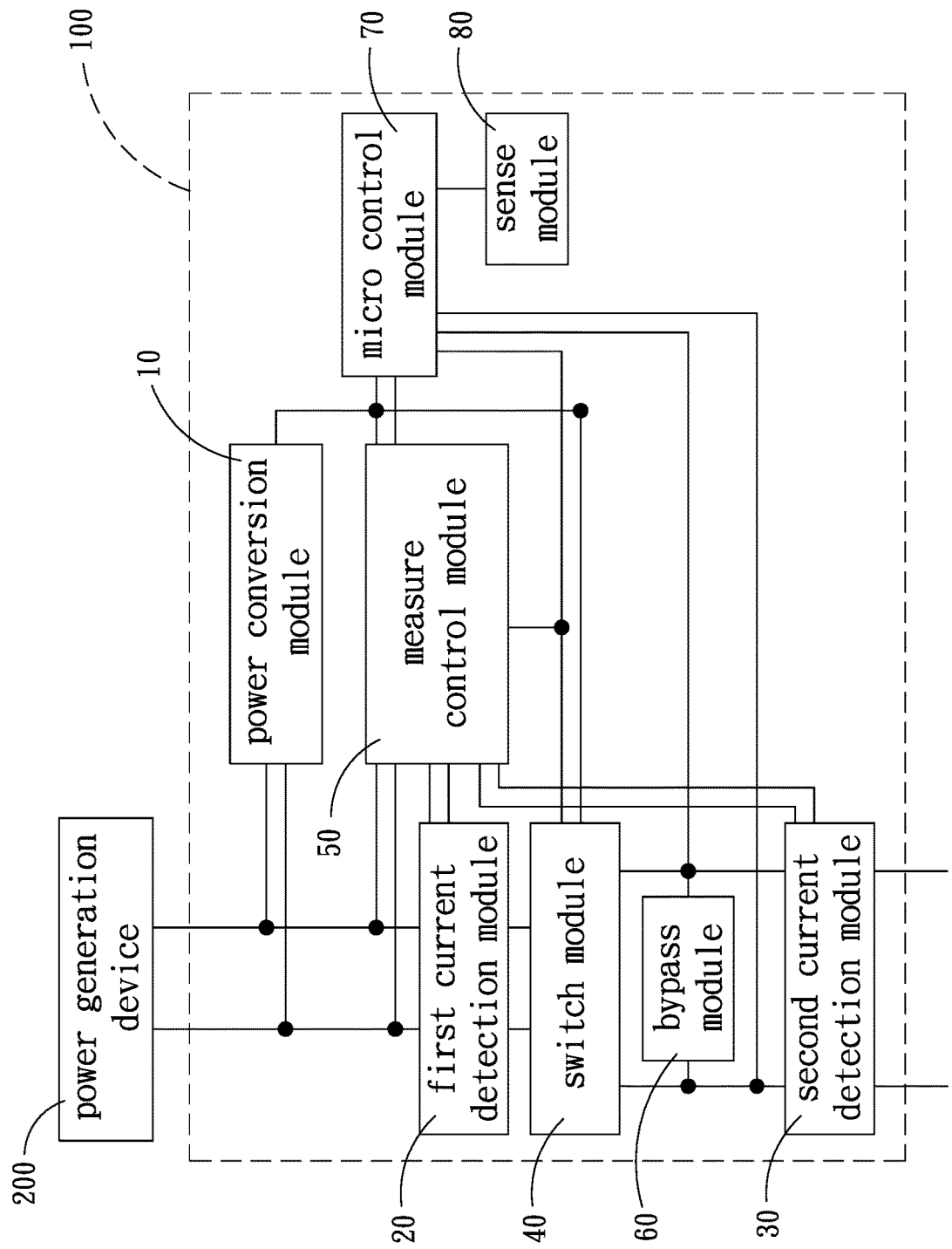
FIG. 2 is a block view of the intelligent optimized power monitoring shutoff device, illustrating the connection of each module.

Referring to FIG. 1 and FIG. 2, in the embodiment, the measure control module 50 further comprises a voltage detection unit 52. The voltage detection unit 52 respectively detects a power generation voltage value of one of the power generation devices 200, and outputs the power generation voltage value to the communication control device 300.

The bypass module 60 is coupled with the switch module 40. When the switch module 40 is in the open-circuit status, the overall string current of one of the power generation strings 1 flows through the bypass module 60, allowing the overall power generation system to maintain the maximum power generation efficiency. Therein, the bypass module 60 is a rectifier.

Referring to FIG. 1, FIG. 2, and FIG. 4, in the embodiment, the intelligent optimized power monitoring shutoff device 100 further comprises a micro control module 70, which is coupled with the measure control module 50 and the communication control device 300. The micro control module 70 comprises a protect control unit 71. The protect control unit 71 is preset with a rated current value and a rated voltage value. The protect control unit 71 receives the power generation current value and the power generation voltage value from the measure control module 50. If the power generation current value is larger than the rated current value or the power generation voltage value is larger than the rated voltage value, the protect control unit 71 outputs a protection signal to the switch module 40, and controls the switch module 40 to be switched from the closed-circuit status to the open-circuit status. Therefore, when the power generation device 200 undergoes a failure or accident, causing a rapid rise in voltage or current which exceeds the rated current value or the rated voltage value, the protect control unit 71 outputs the protection signal and controls the switch module 40 to be switched to the open-circuit status, thereby reducing the damage of the power generation device 200 and maintaining the maximum power generation efficiency of the overall power generation system.

Referring to FIG. 1, FIG. 2, and FIG. 4, in the embodiment, the micro control module 70 further comprises a communication unit 72. The communication unit 72 is configured to transmit the power generation current value, the overall current value, and the power generation voltage value to the communication control device 300, such that the communication control device 300 is allowed to carry out subsequent controlling operation.

As shown by FIG. 1 and FIG. 2, in the embodiment, the intelligent optimized power monitoring shutoff device 100 further comprises a sense module 80, which is coupled with the micro control module 70. The sense module 80 is configured to sense the external environment and output an environment data. Therein, the environment data comprises the temperature, moisture, pressure, and illuminance of the external environment. The micro control module 70 receives the environment data to record the change of external environment when the power generation device 200 undergoes a failure or accident, whereby the comparison of each said value is more accurate.

Figure 3:
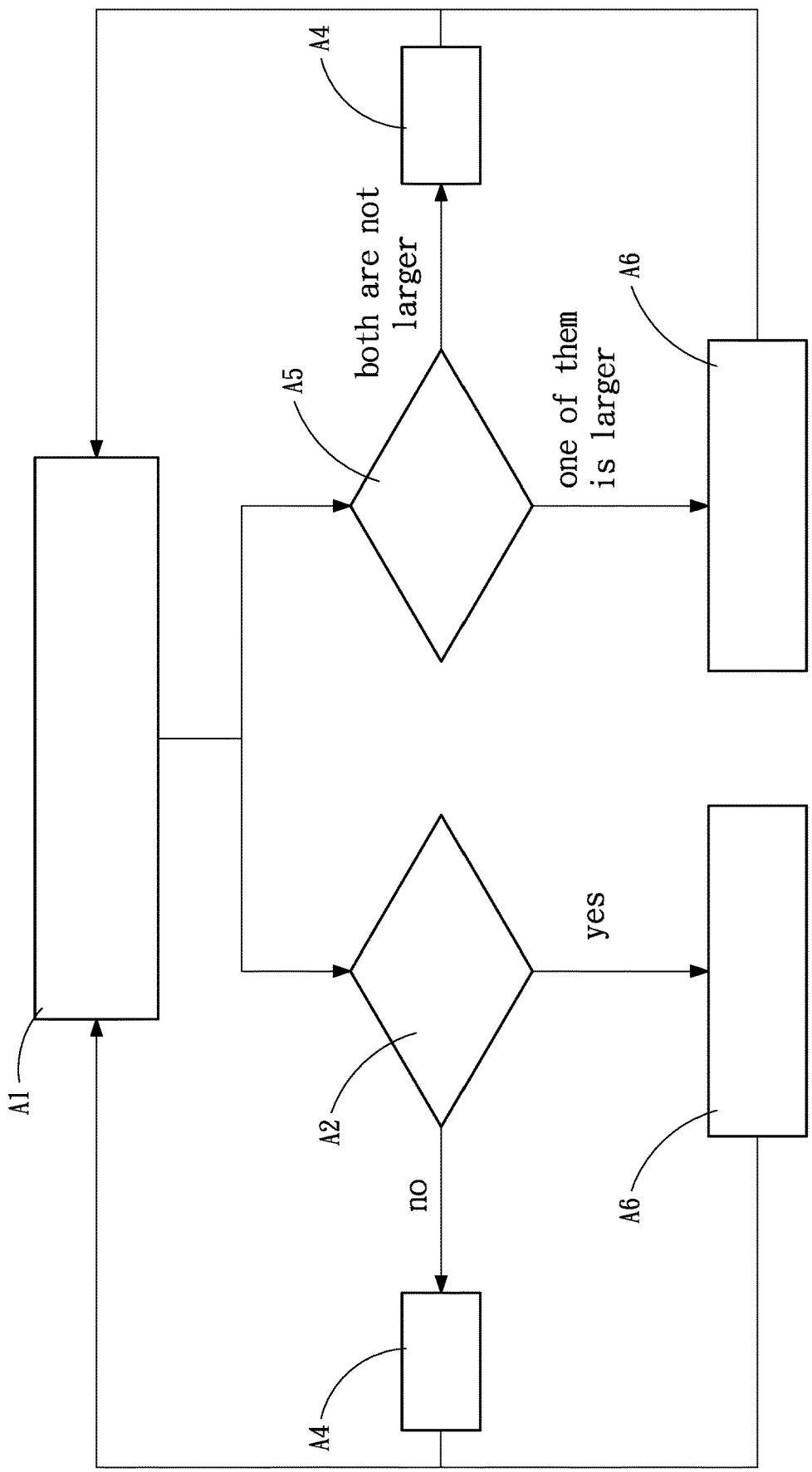
FIG. 3 is a flow chart of the monitoring shutoff method of the intelligent optimized power monitoring shutoff device.

Referring to FIG. 3, the present invention provides a monitoring shutoff method of the intelligent optimized power monitoring shutoff device 100, comprising following steps.

In step A1, the first current detection module 20 of the intelligent optimized power monitoring shutoff device 100 detects the power generation current value of one of the power generation devices 200, and the second current detection module 30 of the intelligent optimized power monitoring shutoff device 100 detects the overall current value of one of the power generation strings 1. Therein, in step A1, the voltage detection unit 52 of the measure control module 50 also detects the power generation voltage value of one of the power generation devices 200.

In step A2, the current compare control unit 51 of the measure control module 50 carries out a comparison to determine if the power generation current value is smaller than the overall current value. As shown by FIG. 1 to FIG. 3, if the power generation current value is smaller than the overall current value, a step A3 is carried out. In step A3, the current compare control unit 51 outputs the current abnormal signal to the switch module 40 of the intelligent optimized power monitoring shutoff device 100 and controls the switch module 40 to be switched from the closed-circuit status to the open-circuit status. As shown by FIG. 1 to FIG. 3, if the power generation current value is not smaller than the overall current value, a step A4 is carried out. In step A4, the switch module 40 maintains the closed-circuit status.

Accordingly, in the actual operation process, if the power generation device 200 connected with the intelligent optimized power monitoring shutoff device 100 undergoes a failure or accident to cause a rapid fall in the current, making the power generation current value smaller than the overall current value, the current compare control unit 51 outputs the current abnormal signal and controls the switch module 40 to be switched to the open-circuit status, thereby isolating the damaged power generation device 200 in the shortest time, and maintaining the maximum power generation efficiency of the overall power generation system. If the power generation device 200 is recovered to operate normally, making the power generation current value equal to or larger than the overall current value, the current compare control unit 51 stops outputting the current abnormal signal, such that the switch module 40 goes back to the closed-circuit status, allowing the power generation device 200 to properly provide the power supply.

Referring to FIG. 1 to FIG. 3, in the embodiment, a step A5 is further included after step A1. In step A5, the protect control unit 71 of the micro control module 70 compares the power generation current value with the rated current value and compares the power generation voltage value with the rated voltage value. If the power generation current value is not larger than the rated current value, and the power generation voltage value is not larger than the rated voltage value, the step A4 is carried out. In step A4, the switch module 40 maintains the closed-circuit status. If the power generation current value is larger than the rated current value, or the power generation voltage value is larger than the rated voltage value, a step A6 is carried out. In step A6, the protect control unit 71 outputs the protection signal to the switch module 40 and controls the switch module 40 to be switched from the closed-circle status to the open-circuit status. Therefore, when the power generation device 200 undergoes a failure or accident, causing a rapid rise in voltage or current which exceeds the rated current value or the rated voltage value, the protect control unit 71 outputs the protection signal and controls the switch module 40 to be switched to the open-circuit status, thereby reducing the damage of the power generation device 200 and maintaining the maximum power generation efficiency of the overall power generation system.

As shown by FIG. 4 and FIG. 5, an intelligent optimized power monitoring shutoff system in accordance with the embodiment of the present invention is provided, comprising the aforementioned intelligent optimized power monitoring shutoff device 100 and the communication control device 300. Therein, plurality of the intelligent optimized power monitoring shutoff devices 100 are provided. The communication control device 300 is configured to monitor the operation status of each intelligent optimized power monitoring shutoff device 100, the power generation status of each power generation device 200, and the power generation status of each power generation string 1. Also, in other embodiments, the intelligent optimized power monitoring shutoff system is able to be connected with an energy storage device (not shown in the figures) of the power generation system as well, so that the intelligent optimized power monitoring shutoff system is also able to monitor the power generation efficiency outputted by the power generation device 200 to the energy storage device.

The communication control device 300 is coupled with a plurality of intelligent optimized power monitoring shutoff devices 100. The communication control device 300 comprises a calculation module 310 and a compare control module 320. The calculation module 310 receives the power generation current value, overall current value, and power generation voltage value transmitted by the communication unit 72 of each intelligent optimized power monitoring shutoff device 100. The calculation module 310 calculates a current standard value according to the power generation current value and the overall current value, and calculates a voltage standard value according to the power generation voltage value. The compare control module 320 respectively compares the power generation current value with the current standard value and compares the power generation voltage value with the voltage standard value. If the said power generation current value of one of the power generation devices 200 is smaller than the said current standard value, or the power generation voltage value of one of the power generation devices 200 is smaller than the voltage standard value, the compare control module 320 outputs a shutoff signal to the switch module 40 of one of the intelligent optimized power monitoring shutoff devices 100 coupled with one of the power generation devices 200, and controls the switch module 40 to be switched from the closed-circuit status to the open-circuit status. Accordingly, the communication control device 300 is able to monitor the operation status of each power generation device 200 of each power generation string 1, and immediately isolates the power generation device 200 which possibly undergoes a problematic situation, so as to maintain the maximum power generation efficiency of the overall power generation system. Therein, the communication control device 300 is a powerline communication gateway.

Referring to FIG. 1, FIG. 2, FIG. 4, and FIG. 5, in the embodiment, the communication control device 300 further comprises a protect control module 330. The protect control module 330 is preset with the rated current value and rated voltage value, and receives the power generation current value and the power generation voltage value transmitted by the communication unit 72 of each intelligent optimized power monitoring shutoff device 100. If the power generation current value of one of the power generation devices 200 is larger than the rated current value or the power generation voltage value of one of the power generation devices 200 is larger than the rated voltage value, the protect control module 330 outputs a protection signal to the corresponding switch module 40 of one of the intelligent optimized power monitoring shutoff devices 100 coupled with one of the power generation devices 200, and controls the switch module 40 to be switched from the closed-circuit status to the open-circuit status. Therefore, when the power generation device 200 undergoes a failure or accident, causing a rapid rise in voltage or current which exceeds the rated current value or the rated voltage value, the protect control module 330 outputs the protection signal and controls the switch module 40 to be switched to the open-circuit status, thereby reducing the damage of the power generation device 200 and maintaining the maximum power generation efficiency of the overall power generation system.

Referring to FIG. 1, FIG. 2, FIG. 4, and FIG. 5, in the embodiment, the communication control device 300 further comprises a balance control module 340. The balance control module 340 obtains a power generation capability value according to the power generation current value, power generation voltage value, or a power generation performance value of each power generation device 200. When the switch module 40 of one of the intelligent optimized power monitoring shutoff devices 100 of one of the power generation strings 1 is in the open-circuit status, the balance control module 340 controls the switch module 40 of other intelligent optimized power monitoring shutoff devices 100 coupled with one of the other power generation devices 200 which has the lowest power generation capability value in the other power generation strings 1 to be switched from the closed-circuit status to the open-circuit status. Accordingly, when one of the power generation devices 200 of one of the power generation strings 1 undergoes a failure or accident, the balance control module 340 is able to isolate the power generation device 200, which has the less ideal power generation capability, of the other power generation strings 1, so as to balance the overall voltage of each power generation string 1, thereby avoiding the voltage imbalance between the plurality of power generation strings 1 and preventing the power generation device 200 from burnt down.

Referring to FIG. 1, FIG. 2, FIG. 4, and FIG. 5, in the embodiment, the communication control device 300 further comprises a remote communication module 350. The remote communication module 350 is coupled with a cloud platform 400. The remote communication module 350 transmits the power generation current value, the overall current value, the current standard value, the power generation voltage value, the voltage standard value, and the switch status of the switch module 40 to the cloud platform 400, allowing the user to monitor the operation stats of each power generation device 200 through the cloud platform 400. Therein, the remote communication module 350 is allowed to be connected with the cloud platform 400 through a cable or wireless connection.

Besides, the user is able to input a new rated current value or new rated voltage value to the communication control device 300 or the cloud platform 400. The new rated current value or new rated voltage value are transmitted to the communication unit 72 through the communication control device 300, such that the protect control unit 71 carries out the comparison with the new rated current value and the new rated voltage value.

As shown by FIG. 4 and FIG. 5, in the embodiment, the intelligent optimized power monitoring shutoff system further comprises an inverter 500. The inverter 500 is coupled between the intelligent optimized power monitoring shutoff device 100 and an alternating current (AC) grid 600. The inverter 500 converts the power inputted by each power generation string 1 into an alternating current, which is then outputted to the alternating current grid 600, such that the alternating current grid 600 is able to transmit the alternating current outputted by the inverter 500. Therein, the inverter 500 comprises a maximum power point tracking (MPPT) control circuit (not shown in the figures). Through the MPPT control circuit, the inverter 500 is able to control the power outputted by the power generation system (the plurality of power generation strings 1) at the maximum performance, so as to maintain the maximum power generation efficiency of the overall power generation system.

Figure 6:
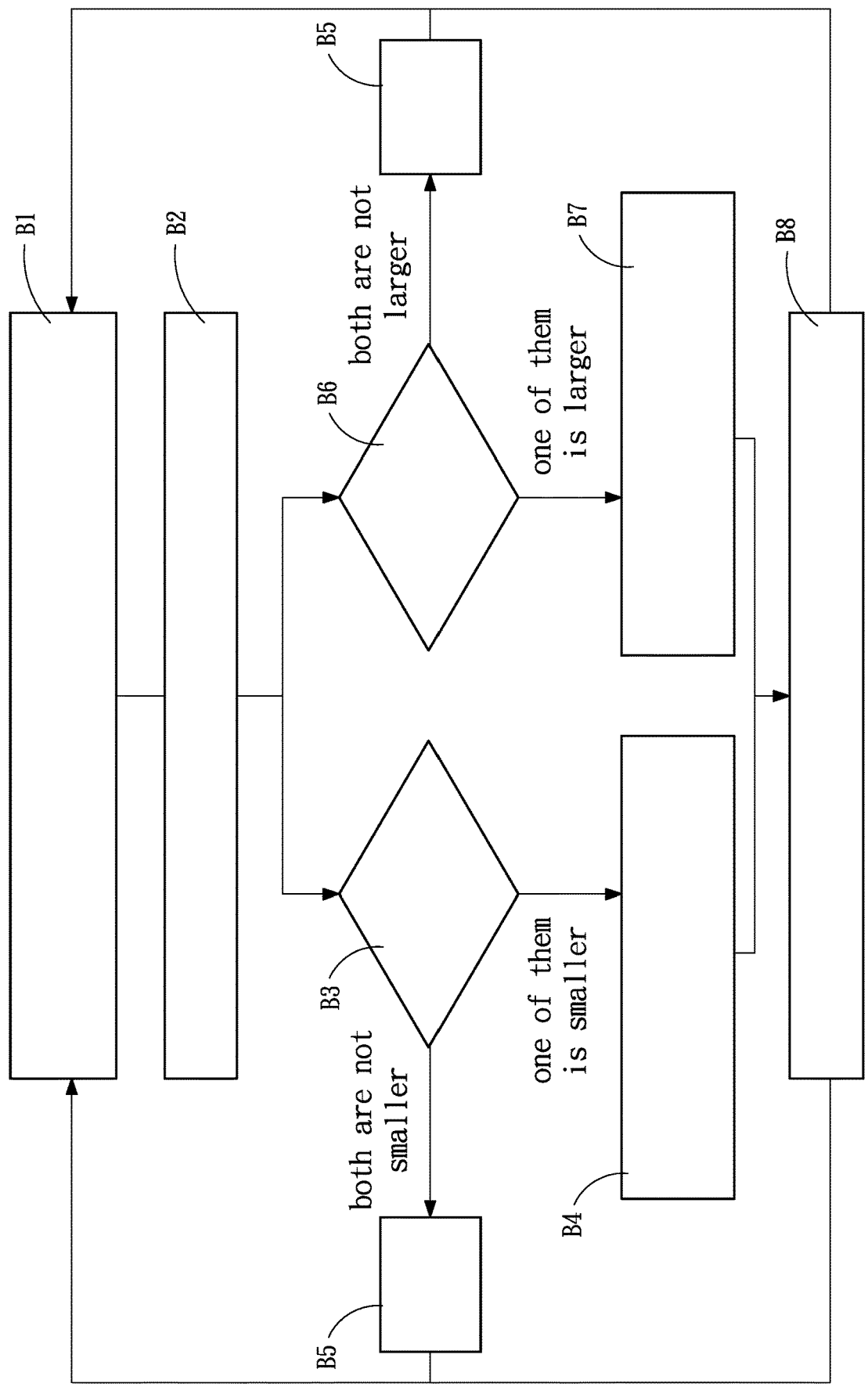
FIG. 6 is a flow chart of the monitoring shutoff method of the intelligent optimized power monitoring shutoff system.

Referring to FIG. 6, the present invention provided a monitoring shutoff method of an intelligent optimized power monitoring shutoff system, comprising following steps.

In step B1, the first current detection module 20 of each intelligent optimized power monitoring shutoff device 100 detects the power generation current value of each power generation device 200, the second current detection module 30 of each intelligent optimized power monitoring shutoff device 100 detects the overall current value of each power generation string 1, and the measure control module 50 of each intelligent optimized power monitoring shutoff device 100 detects the power generation voltage value of each power generation device 200. Then, the micro control module 70 of each intelligent optimized power monitoring shutoff device 100 transmits the power generation current value, the overall current value, and the power generation voltage value to the communication control device 300.

In step B2, the calculation module 310 of the remote control device 300 calculates the current standard value according to the power generation current value and the overall current value, and calculates a voltage standard value according to the power generation voltage value, facilitating the subsequent usage thereof by the compare control module 320 and the protect control module 330.

In step B3, the compare control module 320 of the communication control device 300 compares the power generation current value with the current standard value and compares the power generation voltage value with the voltage standard value. As shown by FIG. 6, in view of FIG. 1 to FIG. 5, if the power generation current value of one of the power generation devices 200 is smaller than the current standard value, or the power generation voltage value of one of the power generation devices 200 is smaller than the voltage standard value, the step B4 is carried out. In step B4, the compare control module 320 outputs the shutoff signal to the corresponding switch module 40 of one of the intelligent optimized power monitoring shutoff devices 100 coupled with one of the power generation devices 200, and controls the switch module 40 to be switched from the closed-circuit status to the open-circuit status. As shown by FIG. 6, in view of FIG. 1 to FIG. 5, if the power generation current value of one of the power generation devices 200 is not smaller than the current standard value, and the power generation voltage value of one of the power generation devices 200 is not smaller than the voltage standard value, the step B5 is carried out. In step B5, the switch module 40 maintains the closed-circuit status.

As shown by FIG. 6, in view of FIG. 1 to FIG. 5, in the embodiment, a step B6 is further included after step B2. In step B6, the protect control module 330 of the communication control device 300 compares the power generation current value with the preset rated current value, and compares the power generation voltage value with the preset rated voltage value. As shown by FIG. 6, in view of FIG. 1 to FIG. 5, if the power generation current value of one of the power generation devices 200 is not larger than the rated current value, and the power generation voltage value is not larger than the rated voltage value, the step B5 is carried out. In step B5, the switch module 40 maintains the closed-circuit status. As shown by FIG. 6, in view of FIG. 1 to FIG. 5, if the power generation current value of one of the power generation devices 200 is larger than the rated current value, or the power generation voltage value is larger than the rated voltage value, a step B7 is carried out. In step B7, the protect control module 330 outputs the protection signal to the corresponding switch module 40 of one of the intelligent optimized power monitoring shutoff devices 100 coupled with one of the power generation devices 200, and controls the switch module 40 to be switched from the closed-circuit status to the open-circuit status.

Accordingly, when the power generation device 200 undergoes a failure or accident, causing a rapid rise in voltage or current which exceeds the rated current value or the rated voltage value, the protect control module 330 outputs the protection signal and controls the switch module 40 to be switched to the open-circuit status, thereby reducing the damage of the power generation device 200 and maintaining the maximum power generation efficiency of the overall power generation system.

As shown by FIG. 6, in view of FIG. 1 to FIG. 5, in the embodiment, a step B8 is further included after step B4 or step B7. In step B8, when the switch module 40 of one of the intelligent optimized power monitoring shutoff devices 100 of one of the power generation strings 1 is in the open-circuit status, the balance control module 340 controls the switch module 40 of other intelligent optimized power monitoring shutoff devices 100 coupled with one of the other power generation devices 200 which has the lowest power generation capability value in the other power generation strings 1 to be switched from the closed-circuit status to the open-circuit status. Accordingly, when one of the power generation devices 200 of one of the power generation strings 1 undergoes a failure or accident, the balance control module 340 is able to isolate the power generation device 200, which has the less ideal power generation capability, of the other power generation strings 1, so as to balance the overall voltage and current of each power generation string 1, thereby avoiding the voltage imbalance between the plurality of power generation strings 1 and preventing the power generation device 200 from burnt down.

With such configuration, the intelligent optimized power monitoring shutoff device 100 of the present invention keeps monitoring the power generation status of the power generation device 200, such that when the power generation device 200 undergoes an abnormality, the present invention is able to immediately isolate the abnormal power generation device 200, thereby preventing disasters and maintaining the maximum power generation efficiency of the overall power generation system.

Also, the communication control device 300 of the intelligent optimized power monitoring shutoff system disclosed by the present invention is able to receive the information outputted by each intelligent optimized power monitoring shutoff device 100, and at the same time provided with the capability of controlling the switch module 40. Therefore, the communication control device 300 is able to comprehensively and precisely monitor the operation status of each power generation device 200 of each power generation string 1, so as to achieve the purpose of maintaining the maximum power generation efficiency of the overall power generation system.

Furthermore, the communication control device 300 of the present invention is able to be connected with the cloud platform 400, so that the user is allowed to carry out a remote monitoring process, lowering the cost of manpower. Besides, the communication control device 300 of the present invention is able to transmit the new rated current value and the new rated voltage value to each intelligent optimized power monitoring shutoff device 100, thereby providing a more precise protection to the power generation system.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A monitoring shutoff method of an intelligent optimized power monitoring shutoff device applied to a power generation system, the power generation system having a plurality of power generation strings, each of the power generation strings having a plurality of power generation devices, one of the power generation devices of one of the power generation strings being coupled with the intelligent optimized power monitoring shutoff device, the monitoring shutoff method of the intelligent optimized power monitoring shutoff device comprising following steps:

step A1: detecting a power generation current value of one of the power generation devices through a first current detection module of the intelligent optimized power monitoring shutoff device, detecting an overall current value of one of the power generation strings through a second current detection module of the intelligent optimized power monitoring shutoff device, and detecting a power generation voltage value of one of the power generation devices through a measure control module of the intelligent optimized power monitoring shutoff device;

step A2: carrying out a comparison to determine if the power generation current value is smaller than the overall current value through the measure control module of the intelligent optimized power monitoring shutoff device; if so, a step A3 is carried out; in step A3, the measure control module outputs a current abnormal signal to a switch module of the intelligent optimized power monitoring shutoff device and controls the switch module to be switched from a closed-circuit status to an open-circuit status; if no, a step A4 is carried out; in step A4, the switch module maintains the closed-circuit status; and step A5: comparing the power generation current value with a preset rated current value and comparing the power generation voltage value with a preset rated voltage value through a micro control module of the intelligent optimized power monitoring shutoff device; if the power generation current value is not larger than the rated current value, and the power generation voltage value is not larger than the rated voltage value, the step A4 is carried out, wherein the switch module maintains the closed-circuit status; if the power generation current value is larger than the rated current value, or the power generation voltage value is larger than the rated voltage value, a step A6 is carried out; in step A6, the micro control module outputs a protection signal to the switch module, and controls the switch module to be switched from the closed-circle status to the open-circuit status.

2. A monitoring shutoff method of an intelligent optimized power monitoring shutoff system, the intelligent optimized power monitoring shutoff system having a plurality of power generation strings, each of the power generation strings having a plurality of power generation devices, the intelligent optimized power monitoring shutoff device comprising:

a power conversion module coupled with one of the power generation devices of one of the power generation strings, the power conversion module converting a power inputted by one of the power generation devices into a power needed by the intelligent optimized power monitoring shutoff device;

a first current detection module coupled with one of the power generation devices and the power conversion module;
a second current detection module coupled with the other power generation devices and the power conversion module;
a switch module coupled with the first current detection module, the switch module being normally in a closed-circuit status;
a measure control module coupled with the power conversion module, the first current detection module, the second current detection module, and the switch module, the measure control module comprising a current compare control unit and a voltage detection unit, the current compare control unit comparing a power generation current value with an overall current value;
a bypass module coupled with the switch module; when the switch module is in the open-circuit status, a current of one of the power generation strings flows through the bypass module; and
a micro control module coupled with the measure control module, the micro control module comprising a protect control unit and a communication unit, the protect control unit being preset with a rated current value and a rated voltage value, the protect control unit receiving the power generation current value and a power generation voltage value from the measure control module,
the monitoring shutoff method of the intelligent optimized power monitoring shutoff system comprising following steps:
step B1: detecting the power generation current value of each of the power generation devices through the first current detection module of each of the intelligent optimized power monitoring shutoff devices, detecting the overall current value of each of the power generation strings through the second current detection module of each of the intelligent optimized power monitoring shutoff devices, detecting the power generation voltage value of each of the power generation devices through the voltage detection unit of the measure control module of each of the intelligent optimized power monitoring shutoff devices, and transmitting the power generation current value, the overall current value, and the power generation voltage value to the communication control device through the communication unit of the micro control module of each of the intelligent optimized power monitoring shutoff devices;
step B2: calculating a current standard value according to the power generation current value and the overall current value, and calculating a voltage standard value according to the power generation voltage value through a calculation module of the communication control device; and
step B3: comparing the power generation current value with the current standard value and comparing the power generation voltage value with the voltage standard value through a compare control module of the communication control device; if the power generation current value of one of the power generation devices is smaller than the current standard value, or the power generation voltage value is smaller than the voltage standard value, a step B4 is carried out; in step B4, the compare control module outputs a shutoff signal to a corresponding switch module of one of the intelligent optimized power monitoring shutoff devices which is coupled with one of the power generation devices, and controls the switch module to be switched from the closed-circuit status to the open-circuit status; if the power generation current value of one of the power generation devices is not smaller than the current standard value and the power generation voltage value is not smaller than the voltage standard value, a step B5 is carried out; in step B5, the switch module maintains the closed-circuit status,
wherein if the power generation current value is smaller than the overall current value, the current compare control unit outputs a current abnormal signal to the switch module and controls the switch module to be switched from the closed-circuit status to the open-circuit status,
wherein if the power generation current value is larger than the rated current value or the power generation voltage value is larger than the rated voltage value, the protect control unit outputs a protection signal to the switch module and controls the switch module to be switched from the closed-circuit status to the open-circuit status,
wherein when the switch module is in the open-circuit status, a current of one of the power generation strings flows through a bypass module of each of the intelligent optimized power monitoring shutoff devices.

3. The monitoring shutoff method of claim 2, wherein a step B6 is further included after step B2; in step B6, a protect control module of the communication control device compares the power generation current value with a preset rated current value, and compares the power generation voltage value with a preset rated voltage value; if the power generation current value of one of the power generation devices is not larger than the rated current value, and the power generation voltage value is not larger than the rated voltage value, the step B5 is carried out; in step B5, the switch module maintains the closed-circuit status; if the power generation current value of one of the power generation devices is larger than the rated current value, or the power generation voltage value is larger than the rated voltage value, a step B7 is carried out; in step B7, the protect control module outputs a protection signal to the corresponding switch module of one of the intelligent optimized power monitoring shutoff devices coupled with one of the power generation devices, and controls the switch module to be switched from the closed-circuit status to the open-circuit status.

4. The monitoring shutoff method of claim 3, wherein the communication control device further comprises a balance control module; the balance control module obtains a power generation capability value according to the power generation current value, the power generation voltage value, or a power generation performance value of each of the power generation devices; a step B8 is further included after step B4 or step B7; in step B8, when the switch module of one of the intelligent optimized power monitoring shutoff devices of one of the power generation strings is in the open-circuit status, the balance control module controls the switch module of other intelligent optimized power monitoring shutoff devices coupled with one of the other power generation devices which has the lowest power generation capability value in the other power generation strings to be switched from the closed-circuit status to the open-circuit status.

* * * * *